United States Patent [19]
Penley

[11] Patent Number: 5,615,928
[45] Date of Patent: *Apr. 1, 1997

[54] QUICK REPLACEMENT BOLSTER FOR PASSENGER SEAT

[75] Inventor: James R. Penley, Pfafftown, N.C.

[73] Assignee: Burns Aerospace Corporation, Winston-Salem, N.C.

[ * ] Notice: The term of this patent shall not extend beyond the expiration date of Pat. No. 5,560,683.

[21] Appl. No.: 504,981

[22] Filed: Jul. 20, 1995

Related U.S. Application Data

[63] Continuation-in-part of Ser. No. 435,890, May 5, 1995.

[51] Int. Cl.⁶ ...................................................... A47C 7/02
[52] U.S. Cl. ................................ 297/452.56; 297/284.9; 297/DIG. 6; 297/228.13
[58] Field of Search .......................... 297/452.56, 452.55, 297/219.1, 228.13, 223, DIG. 6, 284.1, 284.3, 284.5, 284.9, 440.11; 5/636, 922, 652, 653; 244/122 R, 118.6

[56] References Cited

U.S. PATENT DOCUMENTS

| | | | |
|---|---|---|---|
| 3,185,197 | 5/1965 | Spiro et al. | 297/DIG. 6 X |
| 3,455,604 | 7/1969 | Turcksin | 297/440.11 |
| 4,036,524 | 7/1977 | Takamatsu | 297/228.13 X |
| 4,660,237 | 4/1987 | Brodnax | 5/636 |
| 4,844,539 | 7/1989 | Selbert | 297/228.13 |
| 5,007,676 | 4/1991 | Lien | 297/228.13 |
| 5,013,089 | 5/1991 | Abu-Isu et al. | 297/452.56 X |
| 5,149,173 | 9/1992 | Jay et al. | 297/DIG. 6 X |
| 5,154,477 | 10/1992 | Lacy | 297/397 |
| 5,310,245 | 5/1994 | Lyszczasz | 297/284.9 X |
| 5,359,739 | 11/1994 | Rains et al. | 5/922 X |
| 5,378,040 | 1/1995 | Chaney et al. | 297/452.56 X |

Primary Examiner—Milton Nelson, Jr.
Attorney, Agent, or Firm—Adams Law Firm, P.A.

[57] ABSTRACT

A seat back diaphragm with a quick replacement bolster for a vehicle passenger seat which comprises a seat back diaphragm formed of a tubular fabric panel for being placed over a seat back frame of the seat, and a pair of seat back bolsters for being positioned overlying the seat back frame. The bolster includes a long zipper for releasably attaching the bolster to the diaphragm and quickly detaching the bolster from the diaphragm for replacement.

10 Claims, 7 Drawing Sheets

QUICK REPLACEMENT BOLSTER FOR PASSENGER SEAT

This application is a continuation-in-part of application Ser. No. 08/435,890, filed on May 5, 1995.

TECHNICAL FIELD AND BACKGROUND OF THE INVENTION

This invention relates to a back support bolster intended particularly for use in passenger seats, such as aircraft passenger seats. The particular type of bolster disclosed in this application is a side support bolster which extends vertically along both lateral sides of the seat back and provide lateral support to the seat occupant. The bolster is preferably substantially cylindrical in shape and is provided with suitable padding to provide the proper degree of softness and support required by the seat occupant. The bolsters are designed to provide ease of initial assembly and the capability of being quickly replaced when worn or soiled. Replacement of the bolster can take place quickly by removing the covering upholstery, and unzipping the bolster from the seat back diaphragm. The diaphragm and the frame of the seat back form the entire seat back, over which the cover upholstery is placed to create a finished seat.

The diaphragm to which the bolsters are attached is placed under tension when on the seat back frame, and has a slight amount of "give", and thus provides a reasonable degree of comfort for the occupant.

The bolster according to the invention permits location of the bolster quickly and in the exactly proper location and provide maximum comfort and support to the occupant. Proper location of the bolster also results in a neater and more uniform looking seat by positioning the bolster exactly behind the bolster cover panel of the cover upholstery. The design of the bolster and its attachment members results in automatic location of the bolster in the proper position even the replacement of the bolster takes place quickly or by relatively untrained personnel.

SUMMARY OF THE INVENTION

Therefore, it is an object of the invention to provide a bolster for attachment to a seat back diaphragm.

It is another object of the invention to provide a bolster for a seat back diaphragm wherein the bolster can be quickly replaced when worn or soiled.

It is another object of the invention to provide a bolster for a seat back diaphragm which, when installed, is automatically positioned in exactly the correct position.

It is another object of the invention to provide a bolster for a seat back diaphragm which is fabric and which is installed on the seat back diaphragm with a zipper.

These and other objects of the present invention are achieved in the preferred embodiments disclosed below by providing a seat back diaphragm with a quick replacement bolster for a vehicle passenger seat which comprises a seat back diaphragm formed of a tubular fabric panel for being placed over a seat back frame of the seat, and at least one cushioned seat back bolster for being positioned overlying the seat back frame, the bolster including an attachment member for releasably attaching the bolster to the diaphragm and quickly detaching the bolster from the diaphragm for replacement.

According to one preferred embodiment of the invention, the diaphragm comprises a forward side for supporting the back of a seat occupant and a rearward side spaced from the forward side by the seat back frame. The bolster is attached by the attachment means to the forward side of the tubular fabric panel.

According to another preferred embodiment of the invention, attachment members are carried adjacent the top edge of the fabric panel for cooperating with complementary attachment members carried on the seat back frame to assist in maintaining the diaphragm in its proper position.

According to yet another preferred embodiment of the invention, the fabric of the fabric panel comprises a woven fabric.

According to yet another preferred embodiment of the invention, the bolster comprises an elongate cylindrical cushion attached in a vertical orientation along substantially its entire length to the diaphragm.

According to yet another preferred embodiment of the invention, the bolster attachment member comprises one-half of a zipper component, and the diaphragm includes a complementary zipper component for detachably securing the bolster to the seat back diaphragm.

According to yet another preferred embodiment of the invention, the passenger seat includes two bolsters, and the bolster attachment member comprises one-half of a zipper component. The diaphragm includes spaced-apart complementary zipper components for detachably securing the two bolsters thereto.

According to yet another preferred embodiment of the invention, the zipper component is attached to an outer bolster case and extends axially along the tubular bolster cover from one end to the other.

According to yet another preferred embodiment of the invention, the zipper component of the bolster and the complementary zipper component carried by the diaphragm interconnect as a zipper slide is moved in a vertically downwardly direction towards a lower end of the seat back frame, and disconnects as the zipper slide is moved in a vertically upwardly direction towards an upper end of the seat back frame.

According to yet another preferred embodiment of the invention, a passenger vehicle seat is provided which includes bolsters according to the disclosure of this application.

According to yet another preferred embodiment of the invention, a quick replacement bolster is provided for a vehicle passenger seat having a seat bottom and a seat back. The bolster comprises at least one elongate cushion and a bolster attachment member for cooperating with the seat back and the cushion for releasably attaching the cushion to the seat back for supporting the side and back of the passenger seated in the seat.

According to yet another preferred embodiment of the invention, the elongate cushion is attached to the diaphragm in a vertically extending position along substantially its entire length.

According to yet another preferred embodiment of the invention, the bolster attachment member comprises one-half of a zipper component carried by the cushion and a complementary zipper component carried by the seat back.

According to yet another preferred embodiment of the invention, the passenger seat includes two cushions, the bolster attachment member comprises one-half of a zipper component carried by each of the cushions, and the seat back includes spaced-apart complementary zipper components for detachably securing the two cushions on opposite side edges thereof.

According to yet another preferred embodiment of the invention, the zipper component is attached to an outer, substantially tubular bolster case and extends axially along the tubular bolster case from one end to the other.

According to yet another preferred embodiment of the invention, the zipper component of the cushion and the complementary zipper component carried by the seat back interconnect as a zipper slide is moved in a vertically downwardly direction towards a lower end of the seat back, and disconnects as the zipper slide is moved in a vertically upwardly direction towards an upper end of the seat back.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
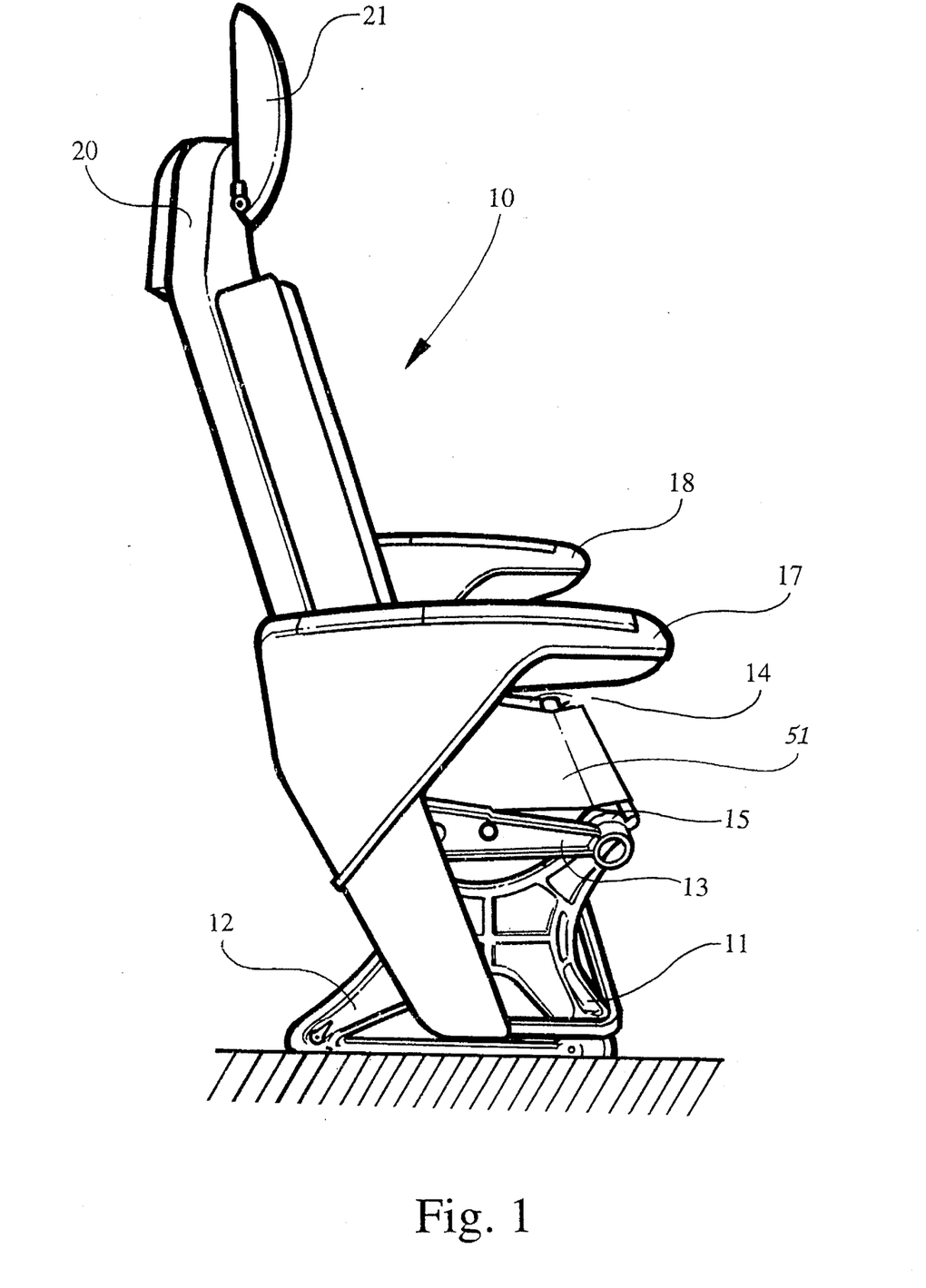
FIG. 1 is a side elevational view of a passenger seat with side bolsters and a seat back diaphragm according to an embodiment of the invention.

Referring now specifically to the drawings, an aircraft passenger seat according to the present invention is illustrated in FIG. 1 and shown generally at reference numeral 10. Seat 10 includes front and back legs 11 and 12 which are normally affixed with track fittings into a track (not shown) mounted on the deck of an aircraft. The seat 10 shown in FIG. 1 is suitable as a relatively high density, short-to-medium haul configuration, and may be a single seat 10 as shown, or combined into seat sets of two or more seats 10. Seat 10 includes seat bottom frames 13 and 14 spanned by support tubes 15 and 16 (See FIGS. 1 and 5) on which is mounted a seat back diaphragm 30, over which is positioned a seat bottom cushion (not shown). Armrests 17 and 18 are mounted on opposite sides of seat 10. A tubular aluminum seat back frame 20 extends upwardly from the seat bottom frames 13 and 14. Seat back frame 20 mounts a headrest 21.

Figures 2, 3:
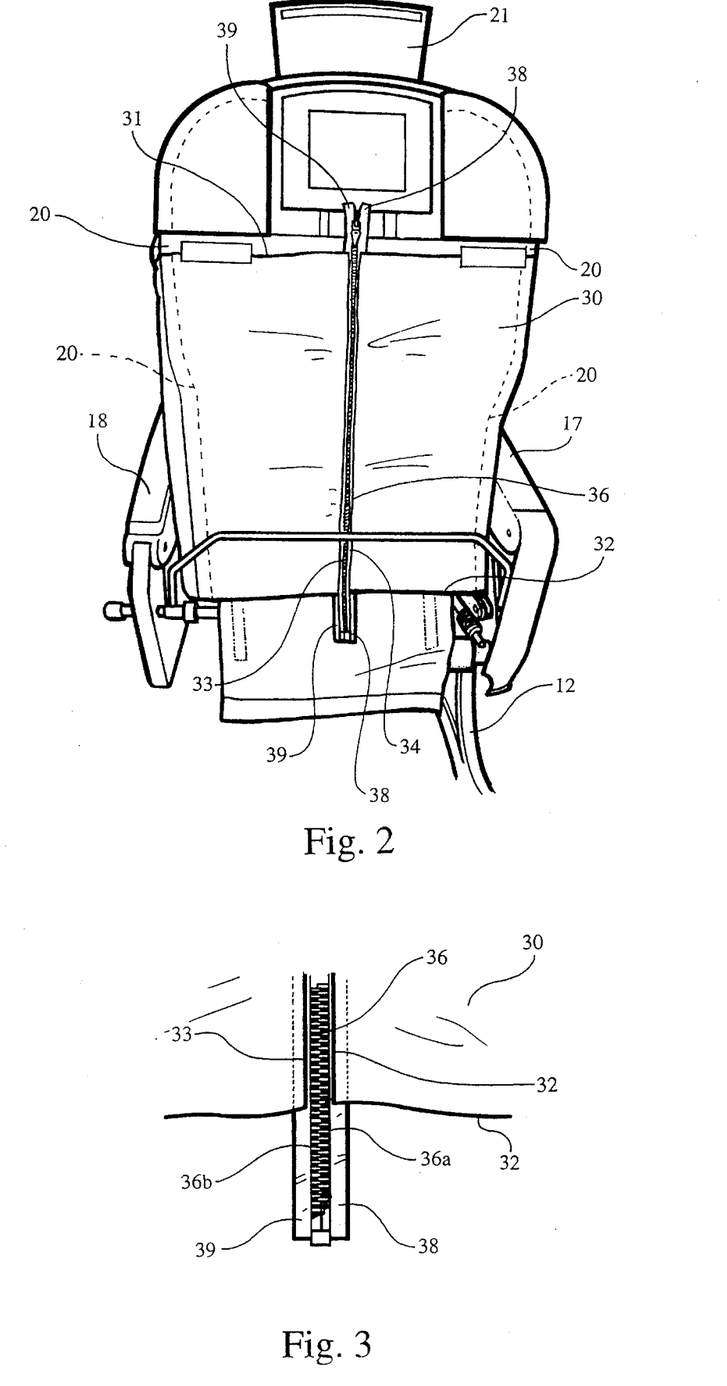
FIG. 2 is a perspective view of the rearward side of the seat in FIG. 1, showing the diaphragm in place on the seat back frame.
FIG. 3 is an enlarged, fragmentary view of the bottom portion of the diaphragm of FIG. 2, showing the lower extended tapes on which the zipper is carried.

Referring now to FIG. 2, a seat back diaphragm 30 according to an embodiment of the invention is shown in position on the seat back frame 20. The bolsters according to the invention are attached to the front side of the seat back diaphragm 30, as described below. The seat back diaphragm 30 is constructed of a woven fabric panel. Seat back diaphragm 30 has a top edge 31, a bottom edge 32 and a pair of side edges 33 and 34. As is generally shown in FIG. 2, the diaphragm 30 fits in a tensioned condition over the seat back frame 20, and is fabricated to conform to the shapes and bends of the seat back frame 20. The seat back diaphragm is held in position on the seat back frame 20 by a zipper 36 which extends from above the top edge 31 to below the bottom edge 32 of the diaphragm 30.

Referring now to FIG. 3, zipper 36 is formed of two zipper components 36a and 36b which are sewn to narrow fabric tapes 38 and 39. In turn, the tapes 38 and 39 are securely stitched by sewing to the side edges 32 and 33 of the diaphragm 30. As is shown, the tapes 38 and 39 with the zipper 36 thereon extend 3–4 inches below the bottom edge 32 of the diaphragm 30. This provides an area which can be easily grasped and manually manipulated to interconnect the zipper components 36a and 36b when installing the diaphragm 30. Since the diaphragm is under substantial tension when installed, it would be difficult to exert sufficient tension on the diaphragm 30 to hold the side edges 32 and 33 together closely enough to connect the zipper components 36a and 36b while at the same time connecting the zipper components.

Use of the extended tapes 39 and 39 therefore permits easy installation by permitting the zipper components 36a and 36b to be connected together in an area where there is no tension. In addition, this feature significantly reduces stress on the bottom edge 32 of the diaphragm 30 and on the zipper 36, since by the time the zipper 36 has been closed to the point of the bottom edge 32 of the diaphragm 30, there is a substantial amount of surface area in the zipper 36 itself over which the tension is spread.

Similarly, tapes 38 and 39 extend upwardly above the diaphragm 30 about 3–4 inches. Thus, the tension on the diaphragm 30 is isolated from the end of the closed zipper 36 by this distance. This reduces the tendency of the tension to slowly unzip the zipper 36. The 3–4 inch distance of the tapes above the top edge 31 of the diaphragm 30 also provides an area which can be easily grasped and manipulated. This is illustrated in FIG. 4.

Figure 4:
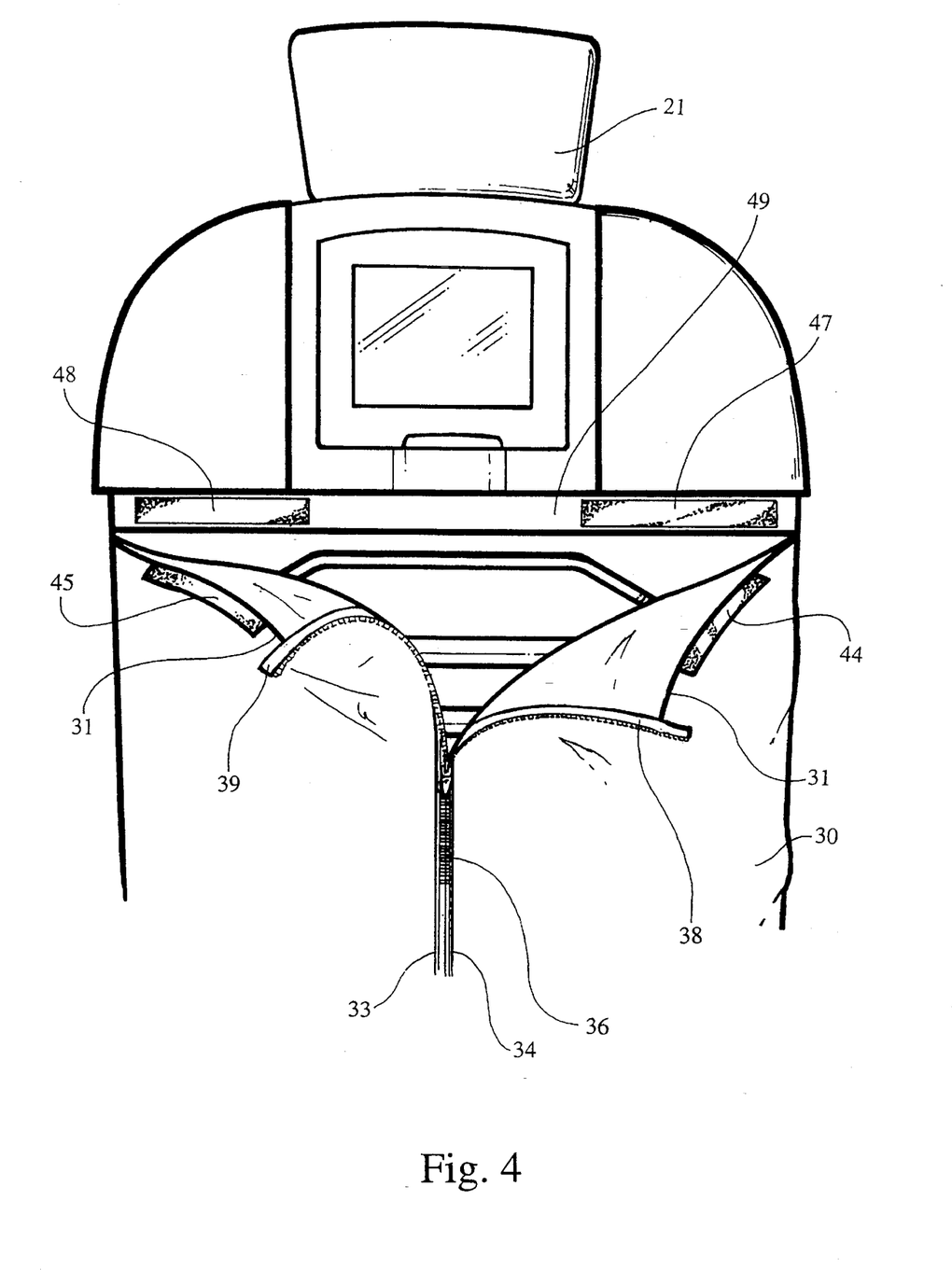
FIG. 4 is an enlarged, fragmentary view of the top portion of the diaphragm of FIG. 2, showing the upper extended tapes on which the zipper is carried.

As is also shown in FIG. 4, a pair of elongate hook and loop fastener strips 44 and 45 are sewn onto the top edge 31 of the diaphragm 30. A portion of each of the strips 44 and 45 is left extending above the top edge 31, and mates with a complementary strip of hook and loop fastener 47 or 48 attached to a lateral support member 49 of the seat back frame 20. This attachment eliminates downward creep of the diaphragm 30 and holds the diaphragm 30 flat against the seat back frame 20.

Figure 5:
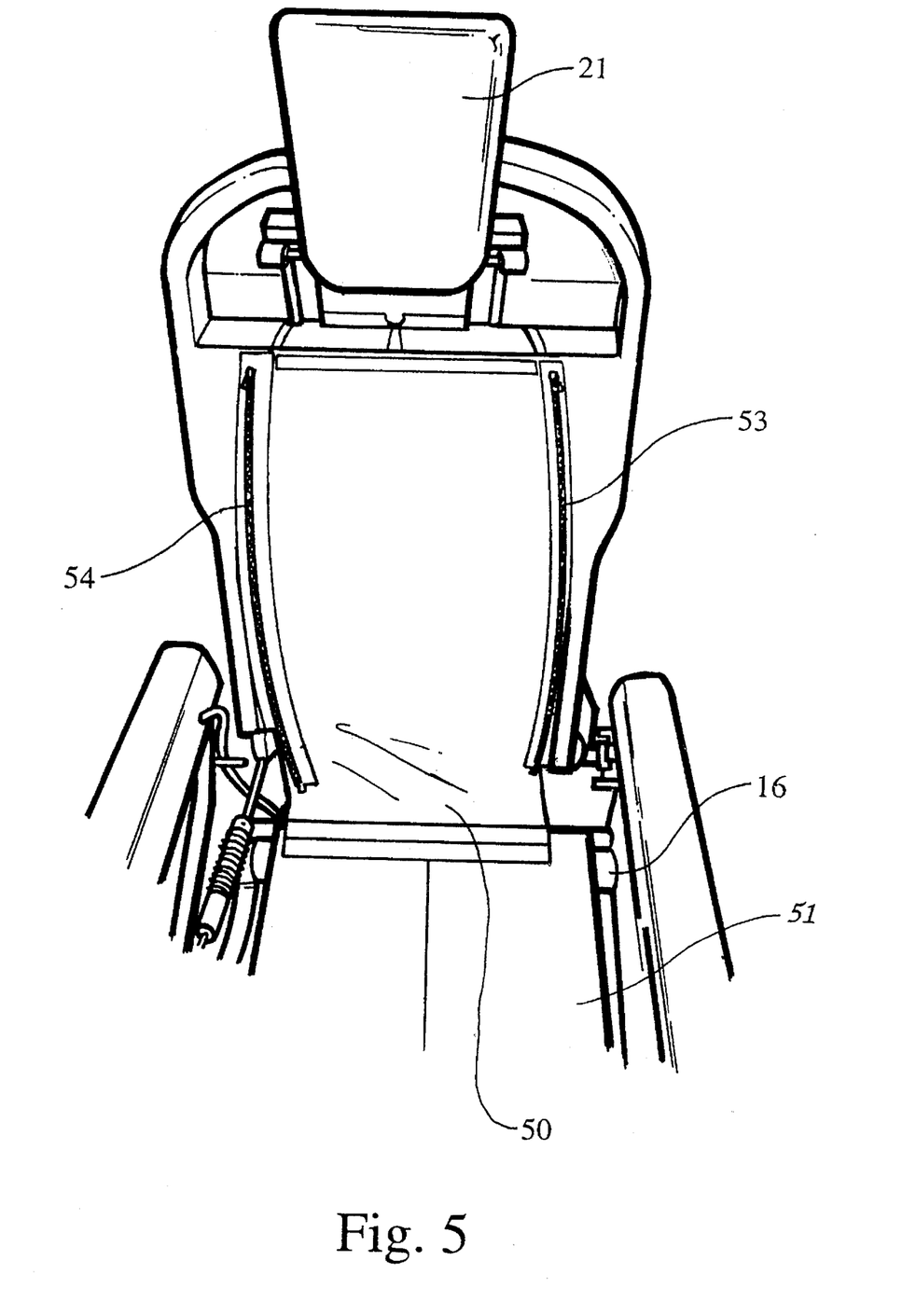
FIG. 5 is a fragmentary perspective view of the seat of FIG. 1 viewed from the front side.

Referring now to FIG. 5, the front of the seat 10 is shown. Seat back diaphragm 30 extends around the front of seat back frame 20 and provides a forward side surface which supports the back of the seat occupant. As noted above, the diaphragm 30 fits tightly around the seat back frame 20 and is under substantial tension. This provides support to the occupant while at the same time providing sufficient "give" to enhance the comfort of the occupant.

The bottom of the forward side of the diaphragm 30 extends downwardly below the extent of the remainder of the diaphragm 30 and forms a seat bottom attachment panel 50 which interconnects the diaphragm 30 with a seat bottom diaphragm 51 or other seat bottom component. Preferably, the interconnection is made using complementary hook and loop fasteners (not shown). This interconnection further anchors the seat back diaphragm in its proper position.

Figure 6:
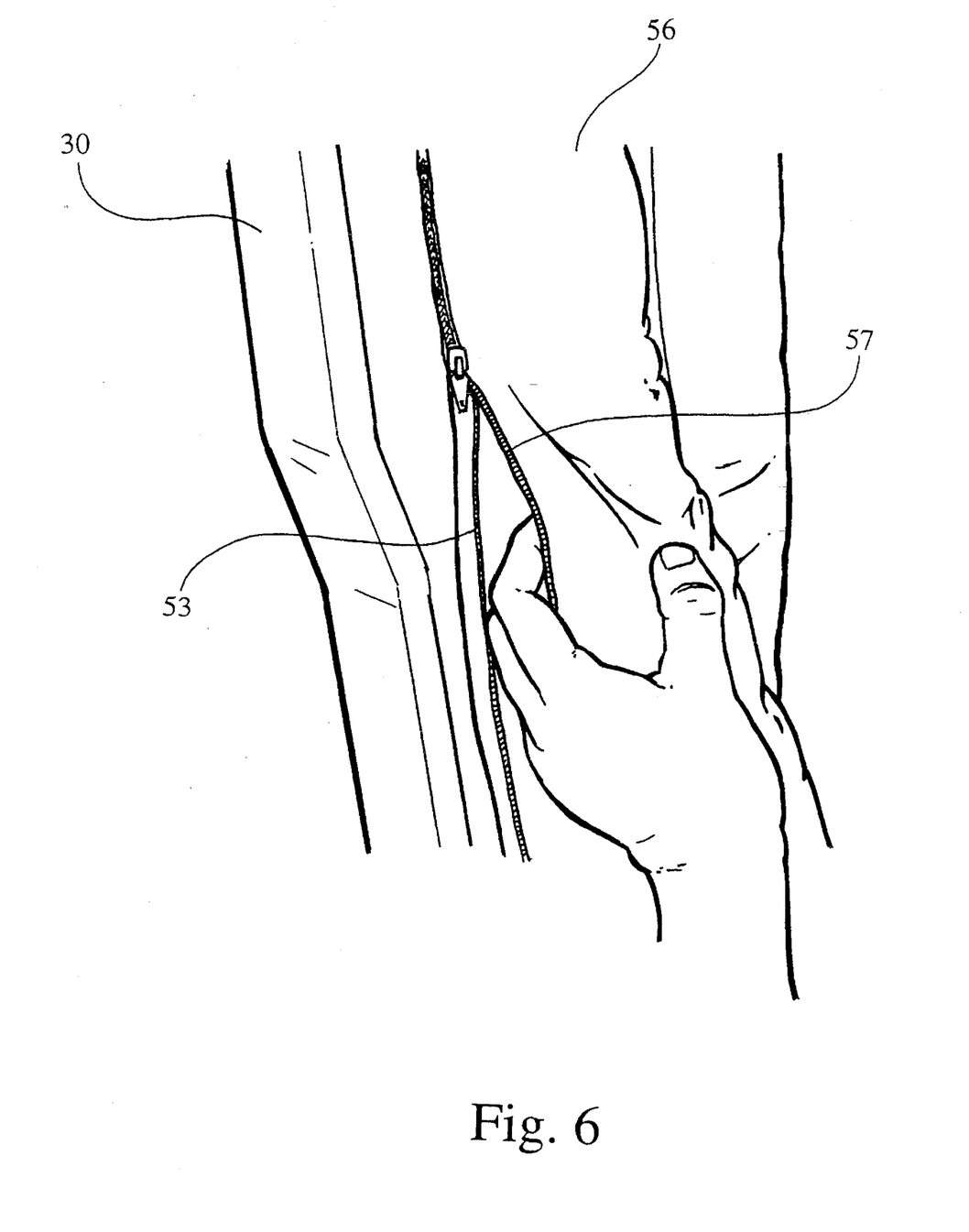
FIG. 6 is a view showing attachment of a bolster to the front of the diaphragm.

As is also shown in FIG. 5, two elongate bolster attachment members in the form of zipper components 53 and 54 extend vertically along the forward side of the seat back diaphragm 30. These zipper components 53 and 54 each comprise one-half of a single zipper. Referring now to FIG. 6, an elongate padded bolster 56 is attached to the diaphragm 30. The bolster 56 has a zipper component 57 which mates with zipper component 53 on the diaphragm 30 and by which the bolster 56 is attached to the diaphragm 30. The bolster 56 is attached to the diaphragm 30 by connecting the two zipper components 53 and 57 and pulling the zipper slide downwardly.

The zipper components 53 and 57 form a long "hinge" on which the bolster 56 can pivot. The ability to pivot permits the bolster to be adjusted to fit properly under the dress seat cover, to adjust itself in response to passenger movement, and relieves strain on the zipper components.

Figure 7:
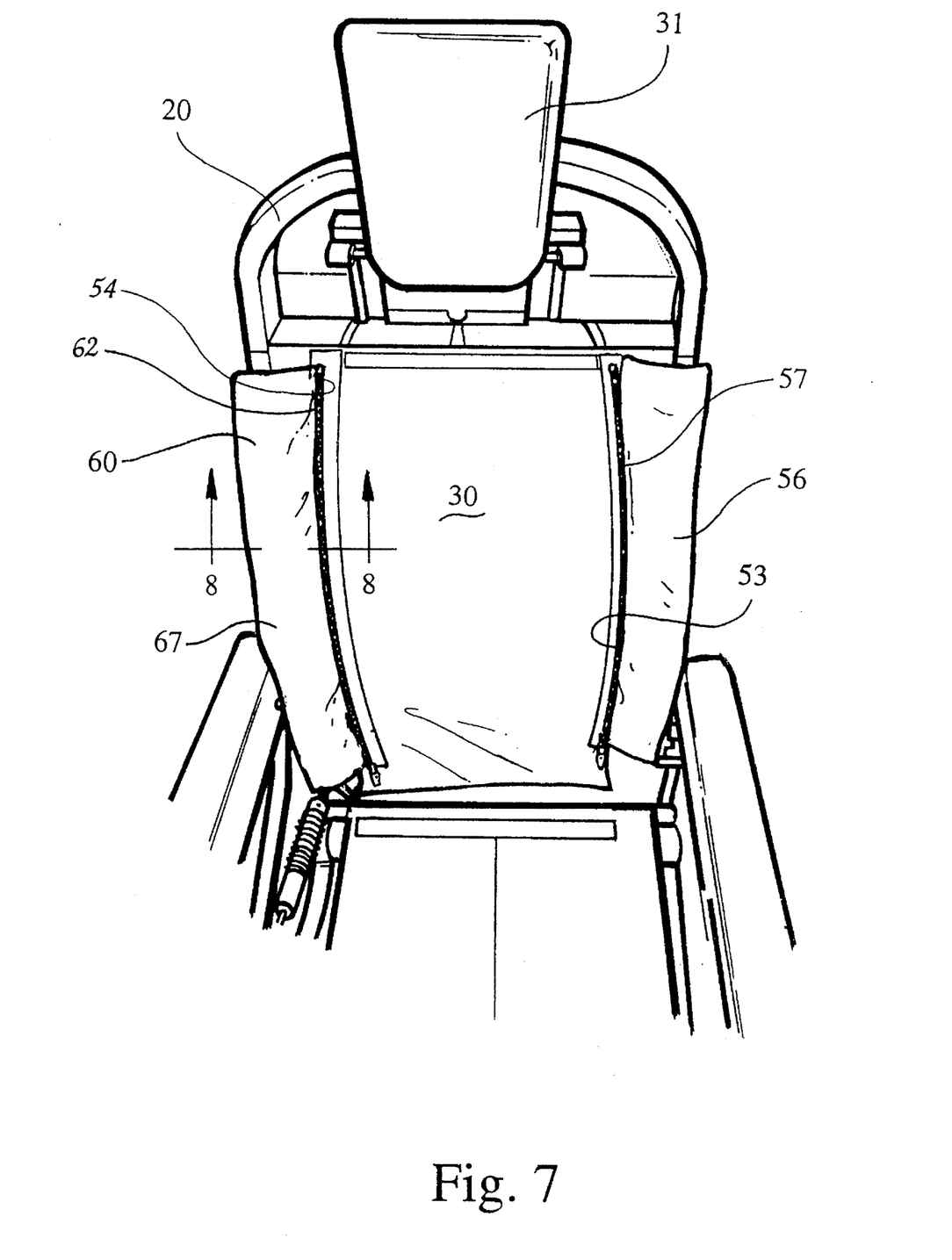
FIG 7 is a fragmentary perspective view of the seat of FIG. 1 with the bolsters in place.

As is shown in FIG. 7, a bolster 60 is attached to the diaphragm 30 by means of zipper component 53 extending vertically along the forward side of the diaphragm 30 in laterally spaced apart position from the bolster 56, which mates with a complementary zipper component 62 extending vertically along the bolster 60 in exactly the same manner as with bolster 56.

Figure 8:
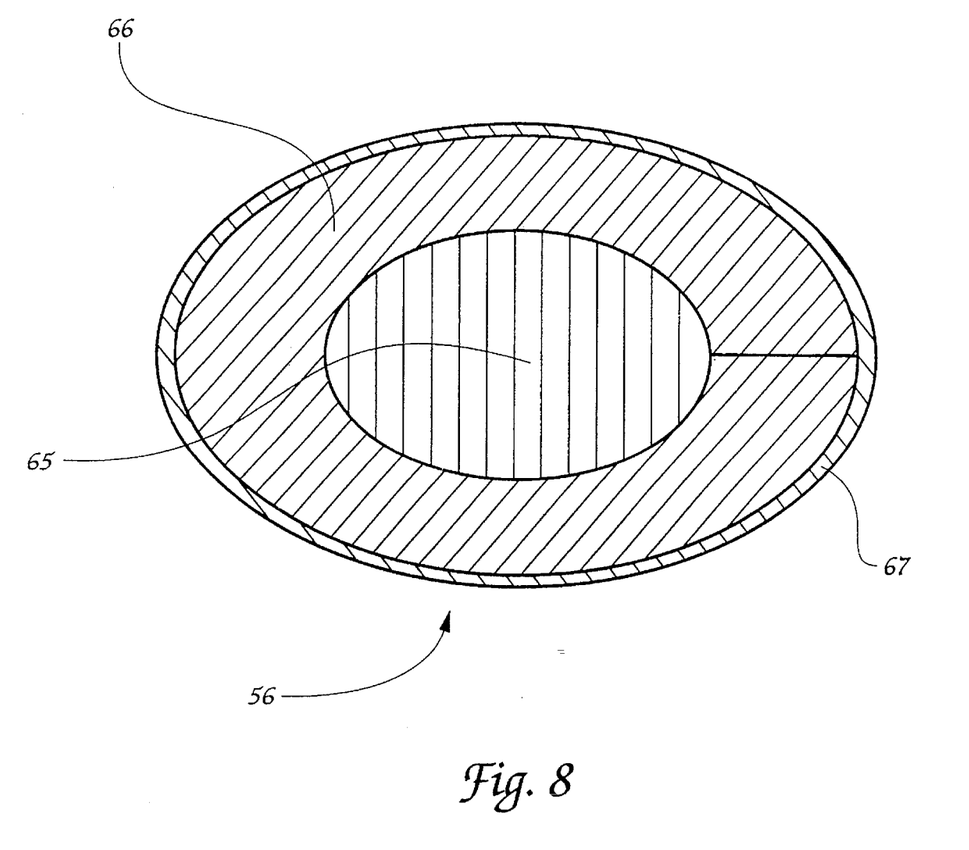
FIG. 8 is a lateral cross-section of a bolster according to the embodiment of the invention shown in FIG. 7, taken substantially along line 8—8 of FIG. 7.

Referring now to FIG. 8, the bolster 56 is formed of a cushion having a solid central core 65 and a surrounding hollow tubular jacket 66. Both the core 65 and the jacket 66 are fabricated of the same foam cushioning material—a product sold under the trademark Cumaguard. The densities and resilience of the foam from which the core 65 and the jacket 66 are constructed can be the same or different, based on particular needs resulting from seat design, configuration, the class of seat and similar considerations. The core 65 and surrounding jacket 66 are enclosed within a case 67 of lightweight fabric suitably treated with fireblocking agents in accordance with FAA requirements. The zipper component 57 is attached to the case 67.

The bolster 60 is constructed identically with bolster 56.

A upholstered seat cover is placed over the diaphragm 30, with the attached bolsters 56 and 60. When necessary because of wear or soiling, the seat cover can be removed, and the diaphragm 30 quickly removed by unzipping the zipper 36 on the diaphragm 30. If desired, the bolsters 56 and 60 can be removed from the diaphragm 30 which is being replaced, and quickly attached by connecting the zipper components 53, 57 and 53, 62. If one or both of the bolsters need replacement, they are easily removed and replaced as described above.

While zippers have been disclosed as the preferred means of forming the diaphragm 30 into its tubular form and for attaching the bolsters 56 and 60 to the diaphragm 30, other attachment means such as hook and loop fastener assemblies or other types of touch fasteners can be used instead.

A replaceable seat back diaphragm is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A quick replacement seat back bolster for a vehicle passenger seat having a seat bottom and a seat back, said seat back bolster comprising:

(a) an elongate cushion having first and second opposed end portions;

(b) a bolster attachment member for cooperating with said seat back and said cushion for releasably attaching the cushion to the seat back of the passenger seat for supporting side and back regions of a passenger seated in the seat;

(c) said bolster attachment member comprising one-half of a zipper component carried by said cushion, and laterally spaced-apart complementary zipper components for being attached to the seat back for detachably securing two of said cushions to the seat back in laterally spaced-apart relation on opposite side edges of the seat back; and (d) wherein said cushion includes an outer, substantially tubular bolster case, and the one-half zipper component carried by said cushion extends axially along the tubular bolster case between the first and second end portions thereof.

2. A quick replacement seat back bolster according to claim 1, wherein said elongate cushion is adapted to be attached to said seat back in a vertically extending position along substantially its entire length.

3. A quick replacement seat back bolster according to claim 1, wherein the zipper component of the cushion and the complementary zipper component for being carried by the seat back interconnect as a zipper slide is moved in a vertically downwardly direction, and disconnects as the zipper slide is moved in a vertically upwardly direction.

4. A quick replacement cushioned seat back bolster assembly for a vehicle passenger seat, comprising:

(a) a seat back diaphragm formed of a tubular fabric panel for being placed over a seat back frame of the seat, said seat back diaphragm including a forward side for supporting the back of a seat occupant when in position on the seat back frame, and a rearward side for being spaced from the forward side of the seat back diaphragm by the seat back frame;

(b) at least one cushioned seat back bolster for being positioned on the forward side of the seat back diaphragm overlying the seat back frame, said seat back bolster including an attachment member for releasably attaching said seat back bolster to the seat back diaphragm and for quickly detaching said seat back bolster from said seat back diaphragm for replacement; and (c) said seat back diaphragm including attachment members carried adjacent the top edge thereof for cooperating with complementary attachment members carried on said seat back frame to assist in maintaining said seat back diaphragm in a proper vertical position on the seat back frame.

5. A quick replacement bolster assembly according to claim 4, wherein the fabric of said fabric panel comprises a woven fabric.

6. A quick replacement seat back bolster assembly for a vehicle passenger seat, comprising:

(a) a seat back diaphragm formed of a tubular fabric panel for being placed over a seat back frame of the seat;

(b) at least one cushioned seat back bolster for being positioned in an overlying relation on the seat back frame, said seat back bolster including a bolster attachment member for releasably attaching said seat back bolster to the seat back diaphragm and for quickly detaching said seat back bolster from said seat back diaphragm for replacement;

(c) said seat back bolster comprising an elongate tubular cushion attached in a vertically extending position along substantially its entire length to said seat back diaphragm; and (d) wherein said seat back bolster attachment member comprises one-half of a zipper component, and said seat back diaphragm includes a complementary zipper component for detachably securing the seat back bolster to the seat back diaphragm.

7. A quick replacement seat back bolster assembly for a vehicle passenger seat, comprising:

(a) a seat back diaphragm formed of a tubular fabric panel for being placed over a seat back frame of the seat;

(b) two cushioned seat back bolsters for being positioned in an overlying relation on the seat back frame, said seat back bolsters each including a bolster attachment member for releasably attaching a respective seat back bolster to the seat back diaphragm and for quickly detaching said seat back bolsters from said seat back diaphragm for replacement;

(c) said seat back bolsters each comprising an elongate tubular cushion attached in a vertically extending position along substantially its entire length to said seat back diaphragm; and (d) wherein said bolster attachment member comprises one-half of a zipper component, and said diaphragm includes spaced-apart complementary zipper components for detachably securing the two bolsters thereto.

8. A quick replacement seat back bolster assembly according to claim 6 or 7, wherein said bolster includes an outer, substantially tubular elongate bolster case, and the zipper component is attached to said tubular bolster case and extends axially along the tubular bolster case from one end to another end thereof.

9. A quick replacement seat back bolster assembly according to claim 8, wherein the zipper component of the seat back bolster and the complementary zipper component carded by the seat back diaphragm interconnect as a zipper slide is moved in a vertically downwardly direction, and disconnects as the zipper slide is moved in a vertically upwardly direction.

10. In combination with a passenger vehicle seat, the quick replacement seat back bolster assembly according to claim 5, 4, 6 or 7.

* * * * *